United States Patent [19]

Chvalovsky et al.

[11] 3,854,986

[45] Dec. 17, 1974

[54] METHOD OF MAKING MINERAL FIBERS OF HIGH CORROSION RESISTANCE AND FIBERS PRODUCED

[75] Inventors: Vaclav Chvalovsky, Praha; Lumir Mach; Helena Machova, both of Ostrava, all of Czechoslovakia

[73] Assignee: Ceskoslovenska Akademie Ved, Praha, Czechoslovakia

[22] Filed: Sept. 26, 1969

[21] Appl. No.: 861,471

Related U.S. Application Data

[63] Continuation-in-part of Ser. No. 762,615, Sept. 25, 1968, abandoned.

[30] Foreign Application Priority Data

Sept. 26, 1967 Czechoslovakia ................ 6819-67

[52] U.S. Cl. .................. 117/126 GS, 65/3, 106/50, 106/85, 106/99
[51] Int. Cl. ............................................. C03c 25/02
[58] Field of Search ................ 65/3; 106/50, 99, 85; 162/154, 156; 117/126 GS

[56] References Cited
UNITED STATES PATENTS

| | | | |
|---|---|---|---|
| 3,095,311 | 6/1963 | Von Wranau et al. ............... | 106/50 |
| 3,523,803 | 8/1970 | Haslay et al. ......................... | 106/50 |
| 2,970,122 | 1/1961 | McLoughlin ..................... | 117/126 X |

*Primary Examiner*—Robert L. Lindsay, Jr.
*Attorney, Agent, or Firm*—Michael S. Striker

[57] ABSTRACT

Mineral fibers of high corrosion resistance are made by employing a base material or composition containing a plurality of oxides of metals from at least one of the groups II, III, IV and VIII of the Periodic Table; adjusting the base raw material or composition so as to furthermore include $TiO_2$ in an amount of at least 1.5 percent by weight of the total composition and at least one oxide of a metal from the group II or IV$a$ in an amount of at least 2.5 percent by weight of the total composition; melting the said raw material or composition; spinning the molten mass into fibers and then coating the thus-formed fibers with a polysiloxane resin. The fibers are particularly suited for incorporation in a cement medium where they may totally or partially replace asbestos fibers previously used for this purpose.

12 Claims, No Drawings

3,854,986

METHOD OF MAKING MINERAL FIBERS OF HIGH CORROSION RESISTANCE AND FIBERS PRODUCED

CROSS-REFERENCES TO RELATED APPLICATIONS

This application is a continuation-in-part of application Ser. No. 762,615 filed by the same inventors on Sept. 25, 1968 now abandoned and assigned to the same assignee and relating to "Method of Manufacturing and Treating Mineral Fibers Resistant in Cement Medium."

BACKGROUND OF THE INVENTION

The present invention relates to a method of manufacturing mineral fibers of high corrosion resistance.

This type of fibers is necessary for incorporation in a cement medium. The usual fiber type incorporated in cement is asbestos fibers. For many years efforts have been made to at least partially replace the asbestos fibers by cheaper man-made fibers. So far these efforts have not been successful.

The essential point in this connection is the necessity to have a fiber which resists corrosion occurring in the hydrating cementous medium. This is a serious problem since, even with properly aged concrete types, a pH value is often reached amounting to about 12. In a medium of this kind, conventional glass or mineral fibers are damaged to an extent such that the cement medium reinforced with these materials gradually loses mechanical strength. With certain types of fibers such as ordinary glass fibers and certain mineral fibers a complete degradation of the fiber may occur. Even basalt fibers which otherwise are highly resistant cannot resist the action of the hydrating cementous medium for any length of time.

It has thus been impossible to obtain a good substitute for an asbestos cement or to obtain a less expensive form of asbestos cement or other fiber-reinforced cementous media by means of mineral fibers or glass fibers in spite of the fact that these fibers have a relatively low price and rather high-grade parameters in connection with their use for structural materials.

It has also been proposed to improve mineral fibers by including a certain amount of titanium in the fiber. This is supposed to improve their alkaline corrosion properties, but in order to really make these fibers resistant to alkaline corrosion, the titanium content had to be increased to 10 or more percent constituted by titanium dioxide.

It has also been proposed to improve the resistance to alkaline corrosion of glass fibers by coating the latter type of fibers with silicone oil films. This process, however, has not been applied to basalt fibers or fibers obtained from iron slags or similar raw materials. Besides, in order to provide for the necessary protection of the fiber, the coating had been necessarily quite thick resulting in a reduction of the adhesion of the hydrated cement to the fiber and thus resulting in poor mechanical properties of the final product. This has in particular prevented the use of mineral fibers for this purpose.

It is therefore an object of the present invention to provide corrosion resistant coated fibers and a method of making them in order to furnish a fiber suited for incorporation in a cement medium and in particular for partial or complete replacement of asbestos fibers in so-called asbestos cements. By this term there are included the so-called asbestos boards and asbestos lumber types of material.

SUMMARY OF THE INVENTION

This object is met by employing a base raw material or composition for the mineral fibers containing a plurality of oxides of metals from at least one of the groups II, III, IV and VI of the Periodic Table and adjusting the basic raw material or composition so as to include $TiO_2$ in an amount of at least 1.5 percent and at least one oxide of a metal from group II or IVa in an amount of at least 2.5 percent by weight of the total composition; then melting the raw material or composition and spinning the molten mass into fibers and finally coating the thus-formed fibers with a polysiloxane resin.

The invention also embraces a mineral fiber obtained by the process just defined and an asbestos cement in which from 5 to 50 percent of the fibers are replaced by the described mineral fibers. The invention also covers a reinforced cement product wherein from 2 to 30 percent of the mineral fibers are constituted by the described fibers of the invention.

DESCRIPTION OF THE PREFERRED EMBODIMENTS

The basic raw material in the present case may be a comparatively inexpensive material such as a basalt, dolomite or a clay or shale such as the North Bohemian clays or shale types. It may also be a slag obtained in iron metallurgy, for instance from a blast furnace operation. It may finally be a special slag obtained in a process for making colored metals and their alloys such as are obtained in the production of zirconium-silicon alloys and iron-titanium alloys.

The basic raw material will already have an increased resistance to corrosion by the action of calcium hydroxide. The original basic material may for instance have the following composition: 35–47% $SiO_2$, 5–18% $Al_2O_3$, 2–15% $FeO + Fe_2O_3$, 2–23% CaO and 1–30% MgO, the total of CaO plus MgO being from 14 to 38 percent, all percentages being given by weight of the total composition.

It is however important and a feature of the invention that the basic composition must be adjusted to contain certain minimum amounts of titanium oxides and of at least one oxide of a metal in group II or IVa of the Periodic Table and preferably at least one oxide selected from the group of zirconium oxide ($ZrO_2$) and zinc oxide (ZnO). The minimum amount of titanium oxide ($TiO_2$) should be 1.5 percent and the minimum amount of the other two oxides or, if only one of them is used, of one of the other two oxides, which preferably are zirconium dioxide and zinc oxide, should be 2.5 percent. The maximum amount of zinc oxide preferably is 2.5 percent and the maximum amount of zirconium dioxide is preferably 5 percent.

For instance, the total composition after adjustment may be as follows: (percentages by weight of total composition)

| | |
|---|---|
| $SiO_2$ | 35–47% |
| $Al_2O_3$ | 5–18% |
| $FeO + Fe_2O_3$ | 2–15% |
| CaO | 2–23% |
| MgO | 1–30% |
| MnO | 0–10% |
| $Na_2O - K_2O$ | below 5% |

Continued

| | |
|---|---|
| TiO₂ | 1.5–10% |
| ZrO₂ | 0–5% |
| ZnO | 0–5% |
| CaF₂ | 0–2% |

In this composition the sum of CaO and MgO content should be between 14 and 38 percent, while the sum of CaO, MgO, Al₂O₃ and SiO₂ content should not be in excess of 90 percent of the total composition.

It will be understood that some of the special oxides used to adjust the composition, such as TiO₂, ZrO₂ and ZnO, may already be present in the original raw material. The point is that, to the extent that they are not present, additional amounts or additional oxides have to be added in order to bring the amount of special components up to the desired value. Secondly, it is not possible to employ a basic material that has the necessary components of titanium dioxide and for instance of zirconium dioxide and zinc oxide. The original base material must meet the requirements regarding melting properties and also fiber formation. It is therefore necessary that the composition of the original or base material is adjusted to the extent necessary by adding additional amounts of titanium dioxide or for instance zirconium dioxide and/or zinc oxide in order to comply with the minimum amounts as stated.

Frequently, the additions are made in technical grades of material containing considerable impurities. For instance, the zinc oxide which may be added may contain iron (III) oxide and other components. The zirconium dioxide normally is in the form of a silicate, for instance as obtained in the form of a zirconium slag or a so-called zirconium concentrate which may include other materials but should have the amount of oxide to provide for the necessary pure oxide in the melt. The base material is then subjected to conventional fiber melt spinning process. The temperature range for this spinning process and melting operation will depend on the kind of raw material. The melting temperature may for instance be in the range between 1,360° and 1,460°C. After forming the fibers in conventional manner by the melt spinning operation, the fibers are then coated with a polysiloxane resin. More specifically, the resin should be a methylsiloxane polymer of the following formula

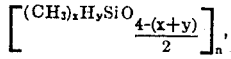

wherein the sum of $x$ and $y$ is less than or equal to 2 and preferably equal to 1 or $y$ is 0 and $x$ is or is close to 2. The number of units of the above formula $n$ may for instance be 200.

It will thus be seen that the fibers made by spinning a melt of the basic composition which is adjusted if not containing the necessary components to include a minimum amount of titanium dioxide and a certain minimum amount of at least one oxide from group II or IV and preferably of at least one oxide from the group of ZrO₂ and ZnO, and that the fibers thus obtained are then coated with the polysiloxane resin.

It has been found that the fibers thus produced meet all requirements as to adhesion to the bonding material, that is to the cement medium, as well as regarding their mechanical properties, particularly their resistance to alkaline corrosion. This is the case even though the siloxane polymer film may be of extreme thinness. For instance, the fibers may have a thickness of 3 denier or 75 μm.

The amount of siloxane polymer resin may be for instance between 1 and 5 grams of polymer dry solid substance per kg of fiber material. The specific amount will depend on the specific resin type used. A finer grade fiber will require a larger portion of siloxane polymer than a coarser type fiber, since the amount of siloxane necessary will depend on the total surface area of fibrous material which must be coated.

Preferably, the siloxane resin is a methyl polysiloxane resin such as a dimethyl siloxane resin.

The methyl siloxane polymer reduces the corroding action of ions upon the fiber mass. It may even prevent contact between the fiber and the ions entirely. This notwithstanding, it does not appear to reduce the adhesion of the fiber to the cement bonding medium.

The methylsiloxane coating is applied to the fiber either in the form of an emulsion or in the form of a spray mist containing the active substance. In both cases the film has to be heat-hardened before the fiber can be used.

It thus appears that as the result of the invention fibers made by the described process have a sufficient resistance to the hydrating cement medium and simultaneously also a good adhesion to the cement medium. The combination of these two properties could not be obtained with previously used glass or mineral fibers.

The following two examples will further illustrate the invention; all percentages are by weight of the total composition.

EXAMPLE 1

A charge comprising 70 percent of basalt and 25 percent of a blast furnace slag was employed in this example. To this charge there was added, prior to melting, an amount of 5 percent of an impure zirconium concentrate containing zirconium oxide together with various other ingredients. After this adjustment, the charge was then subjected to melting at a temperature of 1,390°C. The total composition of the melt after adjustment was as follows:

| | |
|---|---|
| SiO₂ | 39.5 % by weight |
| Al₂O₃ | 10.1 % by weight |
| CaO | 21.5 % by weight |
| MgO | 15.8 % by weight |
| Fe₂O₃ | 4.8 % by weight |
| TiO₂ | 1.6 % by weight |
| MnO | 0.6 % by weight |
| Na₂O + K₂O | 3.1 % by weight |
| ZrO₂ | 3.0 % by weight |

The molten mass was then subjected to spinning by means of a stream of superheated steam in a conventional melt spinning operation. There were thus obtained fibers of a thickness of 5 μm.

The fibers were then coated by an emulsion containing 3 g methylsiloxane resin of the formula CH₃SiO₁.₅ per kg of fiber material. The zirconium concentrate was an Australian "concentrate" in which the zirconium dioxide was present in about 60 percent by weight. It was therefore necessary to add about 5 percent of this composition to arrive at an amount of 3 percent zirconium dioxide in the melt. The emulsion was then subjected to heat-hardening by a thermal treatment. There was thus provided a protective methyl siloxane resin film on the individual fibers. The thus-made fibers had a sufficient amount of corrosion resistance to be used in a hydraulic cement and possessed good adhesion to the cement medium.

EXAMPLE 2

The basic charge in this case consisted of a basalt identified by its place of origin in Czechoslovakia as ZIAR NAD HRONOM.

The corrosion resistance of this basic composition was increased by adding an amount of 5 percent of the total composition of rutile ($TiO_2$).

The total charge then had the following composition:

| | | |
|---|---|---|
| $SiO_2$ | 46.2 | % by weight |
| $Al_2O_3$ | 11.0 | |
| CaO | 16.0 | |
| MgO | 10.1 | |
| $Fe_2O_3$ | 4.1 | |
| $TiO_2$ | 5.4 | |
| MnO | 0.2 | |
| $Na_2O - K_2O$ | 4.0 | |
| ZnO | 3.0 | |

The composition was then subjected to melting at a temperature of 1,430°C.

The molten mass was then subjected to melt spinning as in Example 1 and subsequently there was applied a coating of siloxane resin to the fibers as in Example 1. However, the coating material in this case comprised an amount of 2 g of methylsiloxane having the average formula $$[(CH_3)_{1.2}H_{0.8}SiO_{1.1}]n$$

per kg of fiber material, $n$ in this formula having a value of about 200.

The further treatment, in particular the heat-hardening, followed Example 1.

The fibers made by the processes described in above Examples 1 and 2 were then tested and compared with control fibers. The fiber control fibers had been made two batches of similar basic compositions as used in Examples 1 and 2 but without any additional adjustment of the charge. In particular, no titanium dioxide or rutile or any of the other special oxides such as zirconium dioxide or zinc oxide had been added. Upon a microscopic examination of the fibers after 30 days immersion in a $Ca(OH)_2$ solution, it was found that the fibers had distinct marks of corrosion. It will be noted that this is a comparatively short time of exposure since the fibers are intended to be included in the cement for indefinite times.

The fibers may cause with the above two examples when subjected to the same test showed no corrosion marks at all.

The fibers of the invention are useful in the first place for substitution of part or a larger part of the asbestos in asbestos cement. For instance, from 5 to 50 percent of the asbestos fibers may preferably be replaced by the fibers of the present invention. The fibers can furthermore be used as reinforcement for extremely thin construction elements, that is in so-called fiber-reinforced cement types. In this type of material the reinforcing element is constituted by fibers uniformly distributed throughout the mass of the cement. Many different products may be made from these types of cements, such as asbestos boards and asbestos lumber, the referred-to thin structural elements may be used for making strands, nettings and similar products. The reinforcements in these elements may comprise between 2 and 30 percent of the total mass of the concrete.

As for the type of cement to be used, this is of a conventional type. For instance, it may be Portland cement, slag-Portland cement, trass cement, or a specially prepared cement.

The reference above to group IVa is intended to apply to the group which in some modern versions of the Periodic Table is identified as IVb and in any case includes zirconium.

We claim:

1. Glass fibers coated with a polysiloxane resin wherein said glass fibers are formed of a glass having the following composition:

| | |
|---|---|
| $SiO_2$ | 35–47% |
| $Al_2O_3$ | 5–18% |
| $FeO + Fe_2O_3$ | 2–15% |
| CaO | 2–23% |
| MgO | 1–30% |
| MnO | 0–10% |
| $Na_2O + K_2O$ | below 5% |
| $TiO_2$ | 1.5–10% |
| $ZrO_2$ | 0–5% |
| ZnO | 0–5% |
| $CaF_2$ | 0–2% | the sum of CaO and MgO being between 14 and 38 percent and the sum of CaO, MgO, $Al_2O_3$ and $SiO_2$ being up to 90 percent of the total composition.

2. Coated glass fibers according to claim 1 wherein said resin is a methylsiloxane polymer.

3. Coated glass fibers according to claim 2 wherein said methylsiloxane polymer resin has the unit formula $$\left[(CH_3)_xH_ySiO_{\frac{4-(x+y)}{2}}\right]_n,$$

the sum of $x$ and $y$ being less than or equal to 2.

4. Coated glass fibers according to claim 1 wherein said glass fibers are formed of a glass having the following composition

| | |
|---|---|
| $SiO_2$ | 39.2% by weight |
| $Al_2O_3$ | 10.1% by weight |
| CaO | 21.0% by weight |
| MgO | 15.8% by weight |
| $Fe_2O_3$ | 4.8% by weight |
| $TiO_2$ | 1.6% by weight |
| MnO | 0.6% by weight |
| $Na_2O + K_2O$ | 3.1% by weight |
| $ZrO_2$ | 3.0% by weight | and said resin is a methylsiloxane polymer.

5. Coated glass fibers according to claim 1 wherein said glass fibers are formed of a glass having the following composition:

| | | |
|---|---|---|
| $SiO_2$ | 45.6 | % by weight |
| $Al_2O_3$ | 11.0 | |
| CaO | 16.0 | |
| MgO | 10.1 | |
| $Fe_2O_3$ | 4.1 | |
| $TiO_2$ | 5.4 | |
| MnO | 0.2 | |
| $Na_2O - K_2O$ | 4.0 | |
| ZnO | 3.0 | | and said resin is a methylsiloxane having the average formula $$[(CH_3)_{1.2}H_{0.6}SiO_{1.1}]n$$

wherein $n$ is equal to about 200.

6. Process of making glass fibers coated with a polysiloxane resin comprising melting a glass having the following composition:

| | |
|---|---|
| $SiO_2$ | 35–47% |
| $Al_2O_3$ | 5–18% |
| $FeO + Fe_2O_3$ | 2–15% |
| CaO | 2–23% |
| MgO | 1–30% |
| MnO | 0–10% |
| $Na_2O + K_2O$ | below 5% |
| $TiO_2$ | 1.5–10% |
| $ZrO_2$ | 0–5% |
| ZnO | 0–5% |
| $CaF_2$ | 0–2% | the sum of CaO and MgO being between 14 and 38 percent and the sum of CaO, MgO, $Al_2O_3$ being up to 90 percent of the total composition, spinning the melt into fibers and coating the thusly formed fibers with a polysiloxane resin.

7. The process of claim 6, wherein the polysiloxane resin is a methylsiloxane polymer.

8. The process of claim 7, wherein the siloxane resin has the unit formula $$\left[ (CH_3)_x H_y SiO_{\frac{4-(x+y)}{2}} \right]_n,$$

the sum of $x$ and $y$ being less than or equal to 2.

9. The process of claim 8, wherein the sum of $x$ and $y$ equals 1.

10. The process of claim 6, wherein the base composition consists of basalt or dolomite.

11. The process of claim 6, wherein the basic composition consists of a clay or shale material.

12. The process of claim 6, wherein the base material consists of an iron slag resulting from a blast furnace operation.

* * * * *